United States Patent
Rasi (10) Patent No.: US 12,370,695 B2
(45) Date of Patent: Jul. 29, 2025

(54) HEAD AND STATION FOR PICKING UP A GROUP OF PRODUCTS

(71) Applicant: T.M.C. S.P.A., Castel Guelfo (IT)

(72) Inventor: Michele Rasi, Ferrara (IT)

(73) Assignee: T.M.C. S.P.A., Castel Guelfo (IT)

( * ) Notice: Subject to any disclaimer, the term of this patent is extended or adjusted under 35 U.S.C. 154(b) by 865 days.

(21) Appl. No.: 17/627,932

(22) PCT Filed: Jul. 22, 2020

(86) PCT No.: PCT/IB2020/056891
§ 371 (c)(1),
(2) Date: Jan. 18, 2022

(87) PCT Pub. No.: WO2021/014377
PCT Pub. Date: Jan. 28, 2021

(65) Prior Publication Data
US 2022/0258359 A1 Aug. 18, 2022

(30) Foreign Application Priority Data

Jul. 25, 2019 (IT) .......................... 102019000012939

(51) Int. Cl.
*B25J 15/00* (2006.01)
*B65G 47/91* (2006.01)
*B65G 57/00* (2006.01)
*B65G 57/06* (2006.01)

(52) U.S. Cl.
CPC .......... *B25J 15/0014* (2013.01); *B65G 47/91* (2013.01); *B65G 57/005* (2013.01); *B65G 57/06* (2013.01); *B65G 2203/0233* (2013.01)

(58) Field of Classification Search
CPC ................. B25J 15/0014; B65G 57/06; B65G 2203/0233; B65G 57/005; B65G 49/91

USPC ......................................................... 294/213
See application file for complete search history.

(56) References Cited

U.S. PATENT DOCUMENTS

2005/0220599 A1 10/2005 Job et al.

FOREIGN PATENT DOCUMENTS

| EP | 2508452 A1 | 10/2012 |
| WO | 2014090275 A1 | 6/2014 |

OTHER PUBLICATIONS

International Search Report and Written Opinion dated Nov. 16, 2020 from counterpart International Patent Application No. PCT/IB2020/056891.

*Primary Examiner* — Paul T Chin (74) *Attorney, Agent, or Firm* — SHUTTLEWORTH & INGERSOLL, PLC; Timothy J. Klima (57) ABSTRACT

A pick-up head for groups of tissue products including a support which can be connected to a robotic arm. The support has a first sliding guide in which a first pair of compacting means runs, between an open configuration and a compacting configuration. The pick-up head also includes a plurality of unidirectional chains, wherein the unidirectional chains are positioned outside each compacting means of the first pair and slide between an engaging position and a disengaging position. The pick-up head also includes a plurality of guides associated with respective unidirectional chains, in such a way that the unidirectional chains protrude beyond an end edge of a horizontal stretch of the guide in such a way as to create a cantilever support designed to support the bottom of the group of tissue products during its movement.

14 Claims, 4 Drawing Sheets

HEAD AND STATION FOR PICKING UP A GROUP OF PRODUCTS

This application is the National Phase of International Application PCT/EP2020/056891 filed Jul. 22, 2020 which designated the U.S.

This application claims priority to Italian Patent Application No. 102019000012939 filed Jul. 25, 2019, which application is incorporated by reference herein.

TECHNICAL FIELD

This invention relates to a head for picking up a group of products, in particular tissue type products and thus finds particular use in the context of packaging lines for products such as, for example, kitchen paper, toilet tissues, tissues and other similar products.

BACKGROUND ART

As is known, products of the tissue type are picked up and moved between various stations of a packaging cycle in such a way as to create various layers of products, loose, or already partly packaged together, designed to form a pallet.

There are currently various solutions for picking up and moving these groups of products.

The products are normally transported on a conveyor belt with an arrangement in rows or layers and then, they are blocked beneath a pick-up head using stop devices. The pick-up head compacts the layer (or row) of products in such a way as to avoid empty spaces between one product and another and moves it towards another station. The pick-up head therefore acts both by compacting means and by means for the movement of the products.

In other words, the products to be palletised, already partly positioned in rows or layers, are transported to a pick-up station where they are picked up and moved by a pick-up head towards a second station designed, for example, for the packaging of pallets.

A first system for picking up and moving tissue products consists in a pick-up head comprising a gripper which is able to pick up the single or double rows of products.

According to this system, the products, which are transported one row after another, are compacted and picked up thanks to the pressure exerted by the gripper on the sides of the row. The gripper closing around the row of products imparts on them a compression which moves them close to each other and allows the movement.

A second system consists in picking the products from the conveyor rollers according to a "layer" type pick-up, wherein, for example, several rows are moved close to and/or facing each other, or various groups are aligned and/or face each other in such a way as to make layers with predetermined dimensions. In this case, the grippers, which are usually heavier than those used in the case of "row" type pick-up, make it possible to pick up an entire layer of products, moving it towards the palletizing station.

Normally, during the "layer" type pick-up, the gripper, equipped with four movable grilles, lowers onto the layer of products to be picked up and moves the grilles towards each other in pairs in such a way as to form a cage around the layer of products, which is therefore compressed and then moved.

A further prior art pick-up system consists in a "bottom layer" pick-up wherein, before moving the grilles towards each other for the lateral compression of the layer of products, a mechanical unit formed by two opposite forks is inserted in the empty spaces between one roller of the conveyor belt and the next, positioning under the layer of products to be picked up. The forks, approaching one another, form a base which prevents the falling of products from the layer once it is effectively picked up and moved towards the palletizing station.

Another system is disclosed in patent document WO2014/090275. It illustrates an apparatus for transporting goods from a first station to a second station. The system uses a picking head that can be positioned above or adjacent to a product group to allow at least one extendable chain group to move from a first position to a second position to pick up the product group from below.

The types of pick-up systems described above have some drawbacks.

The "row" pick-up solution is not effective when the products cannot be compressed, or they slip and when high performance levels in terms of cycles/minute of the pick-up station cycles are required.

The "layer" pick-up solution, either the classic or the from-below type, is not effective for products which cannot be compressed or which slip, and it also has the further drawback of requiring a very bulky and heavy pick-up machine.

DISCLOSURE OF THE INVENTION

The technical purpose of the invention is to provide a head and a station for picking up groups of tissue products which are able to overcome the drawbacks of the prior art.

The aim of the invention is to provide a head and a station for picking up groups of tissue products which also allows non-compressible or sliding products to be picked up.

A further aim of the invention is to provide a head and a pick-up station which are more efficient in terms of cycles/minute, compared with those known in the prior art.

The technical purpose indicated, and the aims specified are substantially achieved by a head and a pick-up station for a group of tissue products comprising the technical features described in one or more of the appended claims. The dependent claims correspond to possible embodiments of the invention.

In particular, the technical purpose indicated and the aims specified are substantially achieved by a pick-up head comprising a support connected to a robotic arm and having a first sliding guide extending between two opposite sides of the support.

The pick-up head also comprises a first pair of compacting means, positioned opposite each other and slidable along the first guide of the support between an open configuration, wherein each compacting means is positioned at a respective end of the first guide, and a compacting configuration wherein the compacting means are positioned along the first guide to encircle the group of tissue products.

The pick-up head also comprises a plurality of unidirectional chains, wherein the unidirectional chains are positioned outside each compacting means of the first pair.

The unidirectional chains are able to slide between a disengaging position, wherein they are positioned vertically relative to the compacting means, and an engaging position wherein they are at least partly positioned perpendicularly to the compacting means. When the first pair of compacting means are in the compacting configuration, the unidirectional chains are arranged in an engagement position in such a way as to create a cantilever support which is inserted beneath the group of tissue products for supporting the base during a movement from one processing station to another.

The pick-up head also comprises a plurality of guides associated with respective unidirectional chains. The guides have a vertical stretch and a horizontal stretch in such a way that the unidirectional chains, sliding inside each stretch, protrude beyond an end edge of the horizontal stretch to create the cantilever support.

Advantageously, the use of chains makes it possible to obtain a pick-up head which is less heavy and bulky and is faster in terms of cycles/minute.

Advantageously, the pick-up head can be used along any station of the palletizing line.

In particular, the technical purpose indicated and the aims specified are substantially achieved by a station for picking up a group of tissue products comprising a pick-up head such as the one described above. The station also comprises a roller conveyor designed to move the group of tissue products advancing towards the pick-up head and a front stopping device movable between a lowered position, wherein the stopping device is positioned below the roller conveyor, and a raised position wherein the stopping device extends beyond a level on which the roller conveyor lies in such a way as to block the forward movement of the group of tissue products in a position below the pick-up head.

Advantageously, the station has smaller dimensions than the prior art pick-up stations and allows a fast picking up in terms of cycles/minute.

Further features and advantages are more apparent in the non-limiting description of an embodiment of a head and station for picking up groups of tissue products.

BRIEF DESCRIPTION OF DRAWINGS

The description is set out below with reference to the accompanying drawings which are provided solely for purposes of illustration without restricting the scope of the invention and in which.

DETAILED DESCRIPTION OF PREFERRED EMBODIMENTS OF THE INVENTION

With reference to the accompanying drawings, "T" denotes the pick-up head for a group of tissue products "P".

The pick-up head "T" comprises a support 1 which can be connected to a robotic arm 2, a first sliding guide 3 which extends between two opposite sides of the support 1 and a first pair of compacting means 4 located opposite one another and slidable along the first sliding guide 3 of the above-mentioned support 1.

The first pair of compacting means 4 extends in a direction perpendicular to the opposite sides of the support 1 and moves between an open configuration and a compacting configuration.

Figure 4:
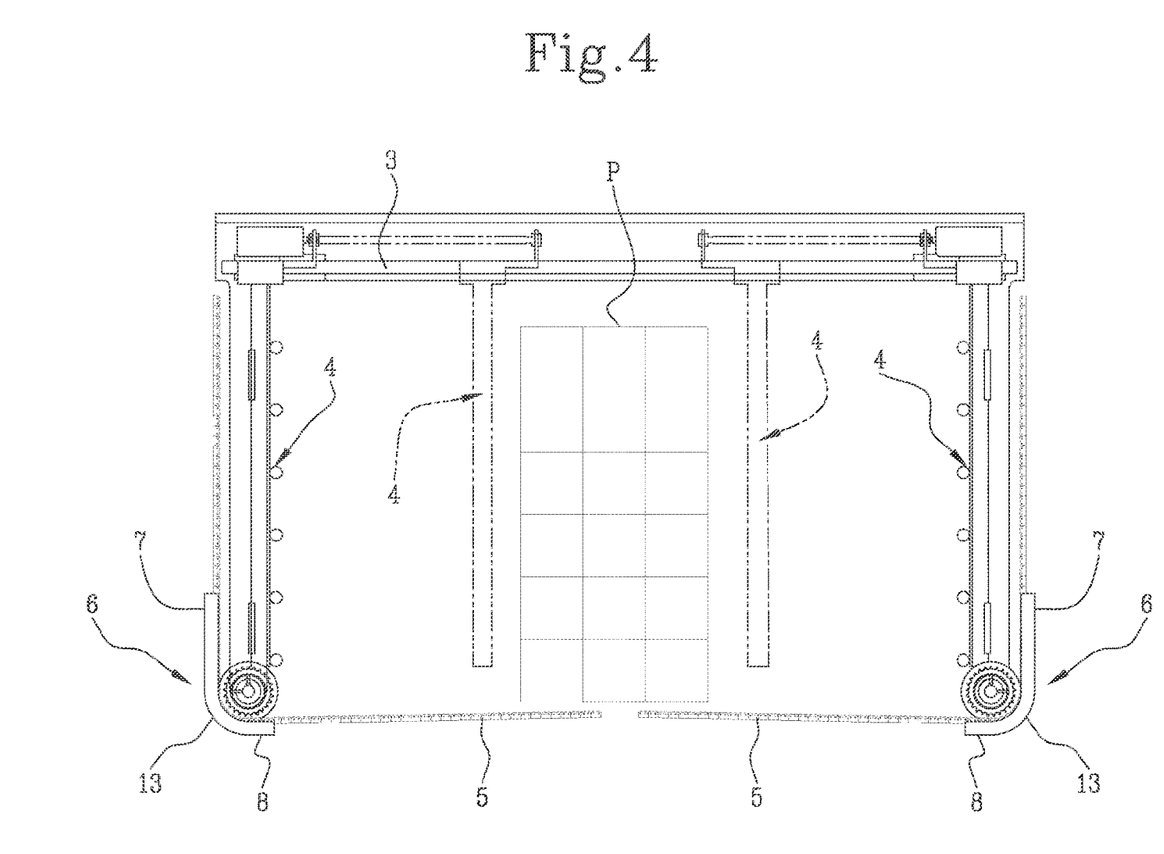
FIG. 4 shows a cross-section view of the pick-up head.

As shown in FIG. 4, in the open configuration, each compacting means 4 are positioned at a respective end of the first sliding guide 3, on the contrary, in the compacting configuration the compacting means 4 are positioned along the first sliding guide 3 to encircle the lateral surfaces of the group of tissue products "P" positioned below the pick-up head "T".

In the embodiment illustrated in the accompanying drawings, the first pair of compacting means 4 has a grid structure comprising various metal bars, for example comprising two vertical bars and a plurality of horizontal bars connected to or connectable to the two vertical bars and distributed along the two vertical bars.

In an embodiment not illustrated, the first pair of compacting means 4 comprises walls having side grooves and a full central portion in such a way as to obtain an effective compaction of the group of tissue products "P".

The movement relative to the first pair of compacting means 4 occurs by use of an actuator 15 preferably motor-driven or pneumatic. Preferably, the actuator 15 is located on the support 1 in the vicinity of the sliding guide 3.

The pick-up head "T" also comprises a plurality of unidirectional chains 5, where the unidirectional chains 5 are located outside each compacting means 4 of the first pair. The unidirectional chains 5 are slidable between a disengaging position, wherein they are positioned in a vertical direction parallel to the compacting means 4, and an engaging position wherein they are at least partly positioned perpendicularly to the compacting means 4 in such a way as to be positioned below the group of tissue products "P" defining a cantilever support.

The unidirectional chains 5 are able to bend only along a single direction of curvature. More specifically, in the engaging position, the unidirectional chains 5 face the group of tissue products "P" so as to prevent a bending due to the force exerted by the weight of the above-mentioned groups of tissue products "P".

For this reason, the cantilever support is able to support the weight of the group of tissue products "P" positioned above it, thanks to the technical characteristics of the unidirectional chains 5.

The unidirectional chains 5 slide from a vertical position parallel to the first pair of compacting means 4 to an at least partly horizontal position perpendicular to the first pair of compacting means 4 (or vice versa).

Preferably, the unidirectional chains 5 have a slight inclination upwards, that is to say, towards the bottom of the group of tissue products "P", when these are in an engaging position. This curvature is used to compensate for the sag (downwards) caused by the weight of the group of tissue products "P" when it is picked up and moved.

Figure 3:
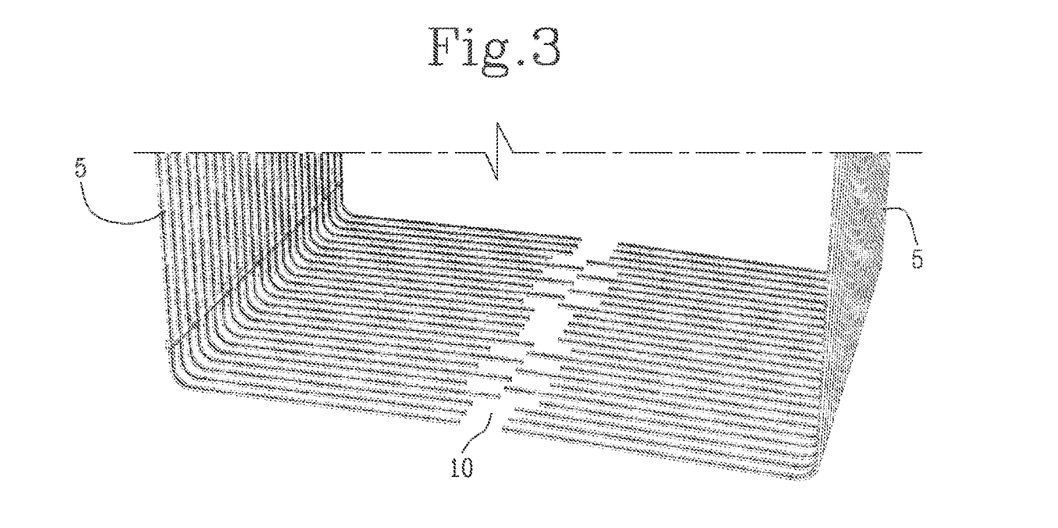
FIG. 3 shows a detail of the plurality of chains.

In the engagement position, the unidirectional chains 5 extend up to, or close to, a mid-plane of the group of tissue products "P" parallel to the opposite sides of the support 1. In this way, as illustrated in FIG. 3, between two respective opposite unidirectional chains 5 there is a gap 10 of between 30 mm and 50 mm (approximately), preferably equal to 30 mm.

Normally, the gap 10 between two opposite unidirectional chains 5 is less than the dimensions of the smallest product present in the group of tissue products "P" to be moved. This avoids the risk that, once the pick-up head "T" lifts the group of tissue products "P" to move it to another processing station, some products fall from the bottom or are not lifted together with the rest of the products. Advantageously, this solution avoids the possibility of damaging an individual product or the group of tissue products "P" which could collapse due to the absence of the individual product generating an "empty space" in the group.

The unidirectional chains 5 also have different lengths from each other wherein at least a first group of unidirectional chains 5 has a length which is less than a second group of unidirectional chains 5. In the embodiment shown in the accompanying drawings, there are three groups of unidirectional chains 5 wherein the chains of each group have different lengths.

In this way it is possible to also use the pick-up head "T" to pick up pallets already formed and provided with a base. In particular, the first and second group of unidirectional chains 5 can be inserted correctly within the base.

In particular, the longer chains are able to insert inside construction holes of the base itself without damaging it. The shorter unidirectional chains 5 do not, however, interfere with the picking up of the base because, in the engagement position, they are outside the relative outline.

The number of unidirectional chains 5, which have a length such as to able to slide under the bottom of the group of tissue products "P", is a function of the dimensions of the group of tissue products "P" to be lifted. Alternatively, the number of unidirectional chains 5 is a function of the dimensions of the base which defines the base of the pallet.

In a preferred embodiment, the unidirectional chains 5 have different lengths, with a maximum of 600 mm, in such a way that they can be engaged even when the base is present at the base of the group of tissue products "P".

Advantageously, with this shape of the unidirectional chains 5, it is possible to pick up and move pallets with the same system normally used for the collection of the layer of products.

The movement of the unidirectional chains 5 from an engagement position to a disengaging position and vice versa is performed by the use of actuators 11, 12 preferably pneumatic.

In a preferred embodiment, there are two different actuators 11, 12, each designed to move a plurality of unidirectional chains 5; in a further possible embodiment, there is a single actuator designed to move both the pluralities of unidirectional chains 5.

The pick-up head "T" also comprises a plurality of guides 6 associated with respective unidirectional chains 5. In other words, each guide is positioned on the outside of each compacting means 4. Each guide 6 has a vertical stretch 7 and a horizontal stretch 8 designed to direct the sliding of the unidirectional chain, 5 in such a way that, in an engagement position, the unidirectional chains 5 protrude beyond an edge of the horizontal stretch 8 of the guide 6. In this way, the horizontal stretch 8 of the guide 6 allows the cantilever support to be directed correctly, so that it can support the bottom of the group of tissue products "P" in such a way that, when the group of tissue product "P" is moved from one processing station to another, there is no risk that some products fall from the bottom of the group of tissue products "P" or are not correctly moved.

Figure 2:
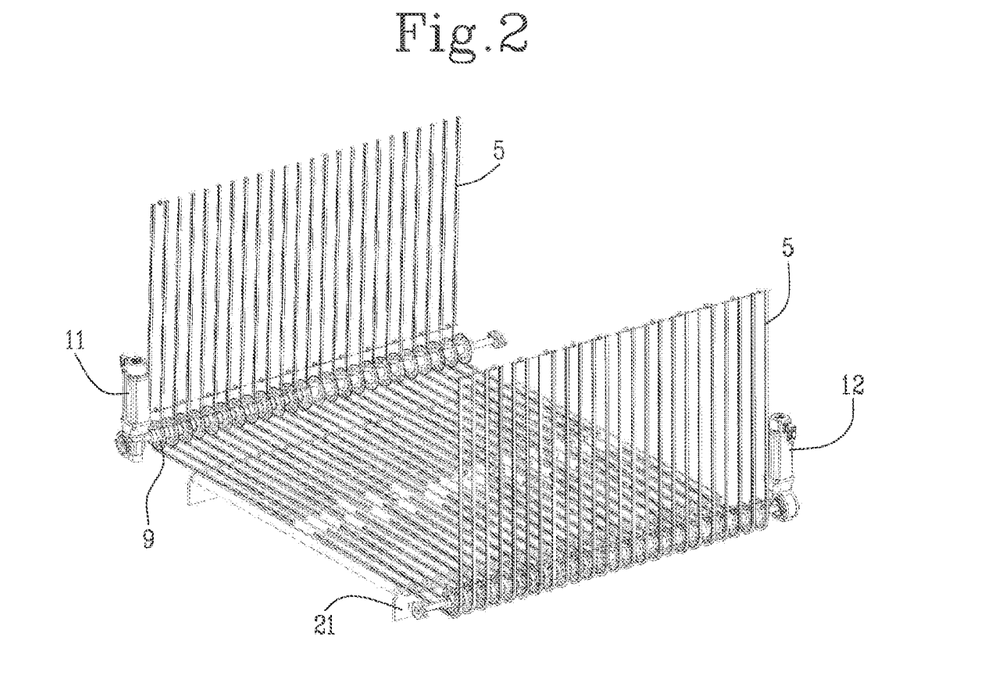
FIG. 2 shows a perspective view of an operating configuration of the chains.

Thanks to the various lengths, the unidirectional chains 5, in an engaging position, protrude from the horizontal stretch 8 of the guide 6 in such a way as to define different extensions below the group of tissue products "P". As illustrated in FIGS. 2 and 3, the unidirectional chains 5 protrude from the horizontal stretch 8 of the guide 6 in such a way as to form cantilever supports of different length allowing a layer of tissue products to be lifted formed by single units or units already partly packaged together.

If the pick-up head "T" is used to move a pallet equipped with a base, at the moment of the passage of the unidirectional chains 5 from the disengaging to the engaging position, only the unidirectional chains 5 which have a certain length are able to protrude from the horizontal stretch 8 of the guide 6 to create a cantilever support below the base. Only the unidirectional chains 5 having, for example, a length greater than that of the other chains of approximately 40/50 mm, are able to slide inside the construction holes of the base, positioning below it to form the cantilever support.

The pick-up head "T" can also comprise, as illustrated for example in the accompanying drawings, a series of pinions 9 comprising a number of pinions 9 equal to the number of unidirectional chains 5. Each pinion 9 of the above-mentioned series is positioned outside each compacting means 4. In other words, each pinion 9 is associated with a respective unidirectional chain 5 and a respective guide 6, outside the compacting means 4.

Each pinion 9 is positioned in the proximity of the guides 6 and is designed to direct the unidirectional chains 5 during the passage from the disengaging position to the engaging position and vice versa. More specifically, each unidirectional chain 5 bends according to a direction of curvature which surrounds at least partly a respective pinion 9. The unidirectional chains 5 are not therefore able to bend in another direction other than that of the curvature of the pinion 9 in common with a respective guide 6. In this way, the combined action of the guide 6 and of the pinion 9 allows the unidirectional chain 5, in the engaging position, to create the cantilever support for supporting the group of tissue products "P".

Preferably, each unidirectional chain 5 is interposed between a respective guide 6 and a respective pinion 9. As illustrated, for example, in FIG. 4, each pinion 9 is positioned in such a way as to create together with the respective guide 6, a guide compartment for the respective unidirectional chain 5. The unidirectional chain 5 runs from the disengaged position to the engaged position making contact firstly with the vertical stretch 7 of the guide 6, then with the curved stretch 13, joining the vertical stretch 7 with the horizontal stretch 8 and extending along at least one circular arc of the respective pinion 9 and lastly with the horizontal stretch 8. In this way, the synergic action of the guide 6 and of the pinion 9 acts as a mechanical guide for the correct directing of the unidirectional chain 5.

In this embodiment of the pick-up head "T" equipped with pinions 9, the actuators 11, 12 move the plurality of unidirectional chains 5 using the series of pinions 9. In other words, the actuators 11 and 12 rotate each pinion 9 in such a way as to slide the unidirectional chains 5 along the guide 6.

Figure 1:
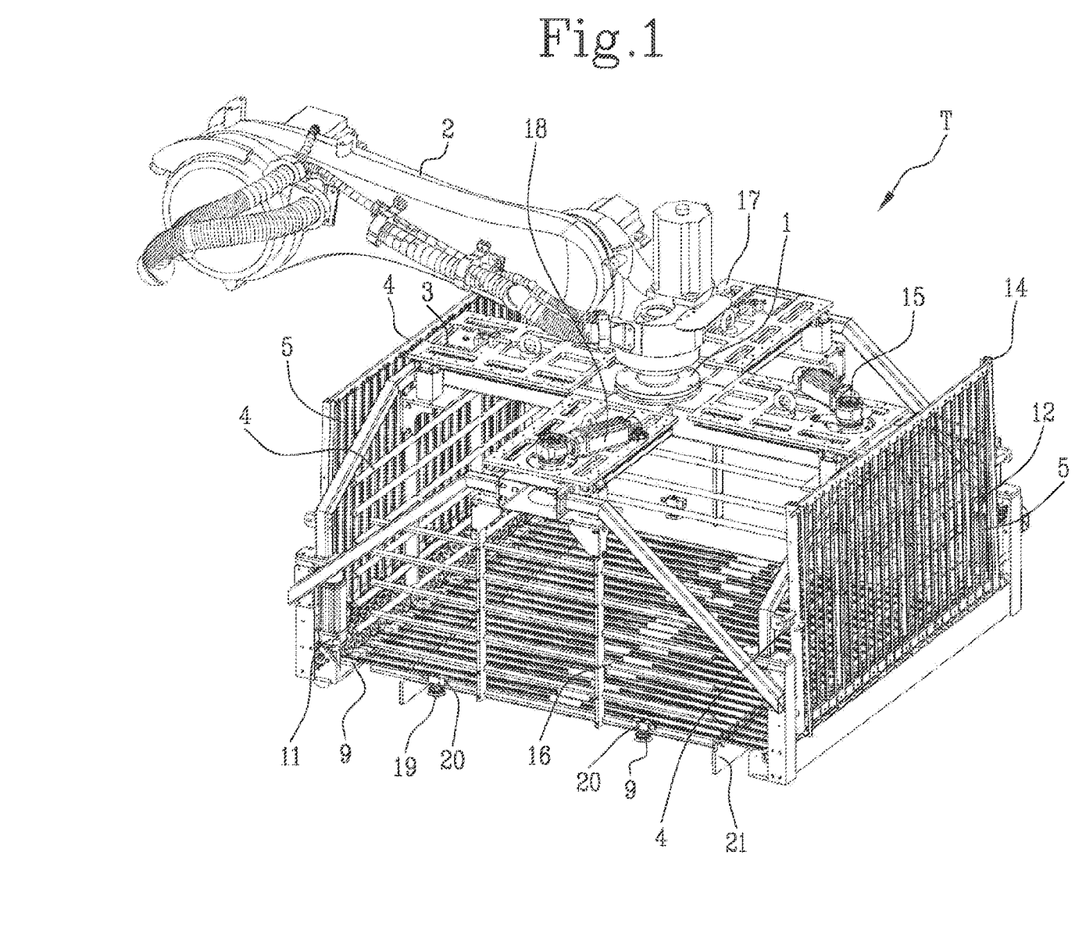
FIG. 1 shows a perspective view of a pick-up head.

In the embodiment illustrated in FIG. 1, the first pair of compacting means 4 is interposed between the plurality of unidirectional chains 5 arranged, when in the disengaged position, along two frames 14 fixed to the ends of the first guide of the support 1. In an embodiment not illustrated, the two frames 14 are made in the form of two supports in the shape of an upturned "U" positioned at the ends of the first guide of the support 1. In other words, the two frames 14 can be made in one piece with the support 1.

In the embodiments described above, the guides 6 and the pinions 9 (if present) are located in a lower portion of the frames 14, in such a way that sliding from the disengagement position to the engagement position, the unidirectional chains 5 can be positioned correctly beneath the group of tissue products. If the pinions 9 are present, the actuators 11 and 12 are positioned in the lower portion of the frames 14.

In a further embodiment, not illustrated, the unidirectional chains 5 are mounted directly on the first pair of compacting means 4. In this embodiment, too, the guides 6 and the pinions 9 (if present) are located in a lower portion of the compacting means 4, in such a way that sliding from the disengagement position to the engagement position, the unidirectional chains 5 can be positioned correctly beneath the group of tissue products. If the pinions 9 are present, the actuators 11 and 12 are positioned in the lower portion of the compacting means 4.

In the embodiment illustrated in FIG. 1, the pick-up head "T" also comprises a second pair of compacting means 16 which are slidable along a second guide 17 of the support 1 positioned perpendicularly to the first 3 and extending between further two sides of the support 1. The second pair of compacting means 16 is also movable between an open configuration, where each compacting means 16 is positioned at a respective end of the second guide 17, and a compacting configuration, where the compacting means 16 are positioned along the second guide 17 to encircle the group of tissue products "P".

For the picking up and movement of the group of tissue products "P" by the pick-up head "T", the first pair of compacting means 4 slides along the first guide 3 till reach the compacting configuration and then the second pair of compacting means 16 slides along the second guide 17 until also being in the compacting configuration thanks to use of a further actuator 18, preferably pneumatic or motor-driven.

In the embodiment illustrated in the accompanying drawings, the second pair of compacting means 16 has a grid structure comprising various metal bars, for example comprising two vertical bars and a plurality of horizontal bars connected to or connectable to the two vertical bars and distributed along the two vertical bars.

In an embodiment not illustrated, the second pair of compacting means 16 comprises walls having side grooves and a full central portion in such a way as to obtain an effective compaction of the group of tissue products "P".

The first pair of compacting means 4 and the second pair of compacting means 16 is therefore made in such a way as to allow a correct mutual moving towards each other of the walls and therefore a correct and effective compacting of the group of tissue products "P". In particular, the lateral portions of the compacting means 4 and 16 are made in such a way as to allow the interpenetration of the walls in order to obtain the correct compaction of the group of tissue products "P".

Preferably, the first pair of compacting means 4 reaches the compacting configuration before the second pair 16.

Preferably, the second pair of compacting means 16 comprises, on each means, at least two suction cups 19 designed to adhere to a cardboard panel which is normally placed between one layer and the other of the group of tissue products "P". The suction cups 19 are positioned on the lower end of the second pair of compacting means 16 and move between a raised position and a lowered position thanks to the use of an actuator, preferably pneumatic and independent of the actuator 18 which moves the second pair of compacting means 16.

The second pair of compacting means 16 also comprises sensors 20 designed to detect the presence of a cardboard panel, more precisely the height at which the cardboard panel is positioned.

In this way, when the pick-up head "T" is above the stack of panels, the sensors 20 measure the distance between the suction cups 19 and the panel at the top of the stack, thus giving the order to the pick-up head "T" and to the suction cups 19 to move down a precise height towards the stack to allow the panel to be picked up correctly. The pick-up head "T" then moves over the of the group of tissue products "P", lowers and the suction cups 19 release the cardboard panel.

Advantageously, the pick-up head "T" described above is more lightweight and less bulky than the traditional pick-up heads. In particular, the chains, both in the disengaging position and in the engaging position, do not protrude beyond the support 1, thus being smaller than in the prior art heads.

In use, the picking up operation performed by the pick-up head "T" occurs when the group of tissue products "P" to be compacted and subsequently moved arrives below the pick-up head "T" by means of rollers. The pick-up head "T" is lowered, and the first pair of compacting means 4 then moves to the compacting configuration approaching and compressing the sides of the group of tissue products as "P", as illustrated in FIG. 4. Simultaneously or subsequently the unidirectional chains 5 slide from the disengaging position to the engaging position, thanks to the use of the pinions 9 (if present), and protrude from the horizontal stretch 8 of each guide 6 to form the cantilever supports for the bottom of the group of products "P".

In other words, the first pair of compacting means 4 are tightened about the two sides of the group of tissue products "P" and push the products of the group to move towards each other, eliminating the empty spaces, at the same time the plurality of chains 5 slide progressively from the disengaging position to the engaging position below the bottom of the group of tissue products "P". In this situation, the pick-up head "T" moves the group of tissue products "P" towards a subsequent processing station.

Advantageously, this movement operation is more secure since the correct support of the group of tissue products "P" is ensured, as well as guaranteeing the prevention of damage to the groups.

The invention also relates to a station "ST" for picking up a group of tissue products "P" comprising a pick-up head "T" as described above. In other words, the pick-up station "ST" may comprise any of the embodiments of the pick-up head "T" described above.

The pick-up station "ST" also comprises a roller conveyor 21, positioned along a direction parallel to the second pair of compacting means 16, designed to move the group of tissue products "P" to the pick-up head "T". The roller conveyor 21 has a U-shaped profile positioned below the level in which it lies which allows the unidirectional chains 5 to run between one roller and the next when they are in the engaging position. Preferably, the unidirectional chains 5 of the pick-up head "T" have a smaller cross section than the U-shaped profiles positioned below the level on which the roller conveyor 21 lies.

In a preferred embodiment, the roller conveyor has a number of rollers variable between twenty and forty rollers. Preferably, the number of rollers in the station is defined on the basis of the dimensions of the group of tissue products "P" to be made.

The pick-up station "ST" also comprises a front stopping device, not illustrated, which is movable between a lowered position wherein it is positioned below the roller conveyor 21, and a raised position wherein it extends beyond the level on which the roller conveyor 21 lies, for stopping the forward movement of the group of products.

In the pick-up station, the roller conveyor 21 receives the products arriving from the roller conveyors (or from the belts) upstream and conveys them towards an area below the pick-up head "T". The products conveyed can be loose or already partly packaged together; in any case their size is greater than that of spacing of the roller conveyor 21 so that there is not even the risk of falling of even the smaller loose products.

When the products reach the area below the pick-up head "T", the stopping device extends beyond the level of the roller conveyor 21 to stop its forward movement.

In a preferred embodiment, the device is formed by blades which protrude from the roller conveyor 21 in a perpendicular direction to it using the space between two adjacent rollers.

Subsequently, the stopping device lowers, the pick-up head "T" lowers onto the group of tissue products "P", the pairs of compacting means 4 and 16 (the latter if present) pass from the open configuration to the compacting configuration and the unidirectional chains 5 pass from the disengaging position to the engaging position.

Figure 5:
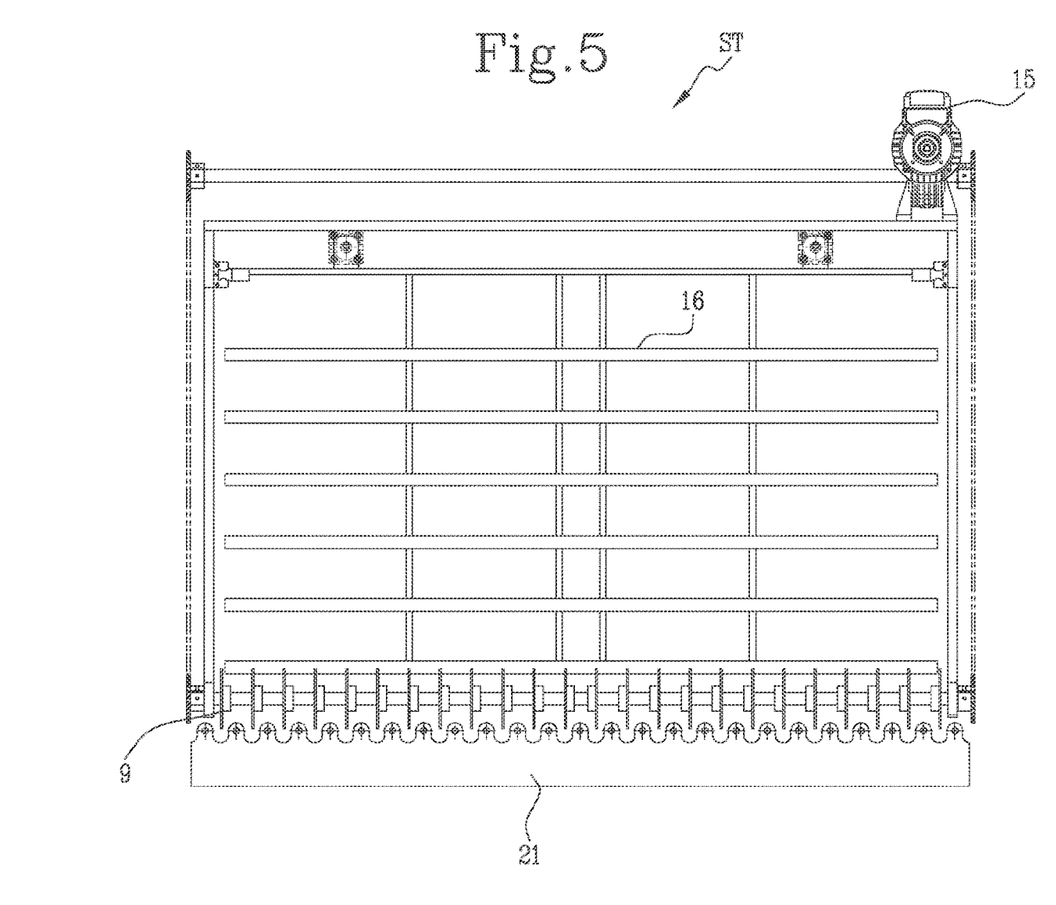
FIG. 5 shows a side view of the pick-up station.

As illustrated in the embodiment of FIG. 5, the series of pinions 9 are arranged in such a way that each pinion 9 is interposed between one roller and the next; in this way when the unidirectional chains 5 move to the engaging position, they slide between one roller and the other of the roller conveyor 21. In other words, the unidirectional chains 5 are spaced at intervals equal to the spacing of each roller and they are offset in such a way as to allow them to be inserted between the rollers.

Subsequently, the pick-up head "T" rises and moves the group of tissue products "P" compacted in this way to the next processing station, in particular towards the palletizing station. The release of the group of tissue products "P" in the palletizing station is performed by the sliding of the unidirectional chains 5 from the engaged position to the disengaged position and by the subsequent moving away of the first and second pairs of compacting means 4 and 16 (if present) from the group of tissue products "T" towards an open configuration.

The pick-up head "T" may, after having released the group of tissue products "P", before picking up a second group of products, be moved to withdraw a cardboard panel from the stack and then position it on the layer of products just released.

The invention achieves the above-mentioned aims, eliminating the drawbacks highlighted in the prior art.

In effect, the structure of the pick-up head "T" according to this invention allows a device to be obtained which is able to pick up tissue products "P" of any type, since the collaboration between the pairs of compacting means 4 and 16 and the unidirectional chains 5 also allows the picking up of non-compressible and/or sliding products, which makes the pick-up head "T" very versatile.

As confirmation of the versatility of the proposed solution, it should be noted that the head "T", according to the invention, is also able to move and manage particularly high and unstable products such as, for example, kitchen rolls.

In this case, the above-mentioned tissue products product "P" can be transported below the pick-up head "T" by flat belts (not illustrated) which are spaced from each other to form full lines (belts) and empty spaces parallel to each other and extending parallel to the direction in which the products are fed. The pick-up head "T" is rotated by 90° in such a way as to allow the picking up by means of the entrance of the chains 5 into the empty passages and then picking up the tissue products "P" between the "head" and "tail" of the group of belts.

Advantageously, the pick-up head "T" is therefore able to pick up the tissue products "P" also if it is rotated by 90° by the robotic arm providing a high degree of versatility not only in terms of type of products which can be moved but also in terms of operating conditions of the head itself, that is to say, on picking up platforms also having different structures (strips or rolls, for example).

A further advantage is due to the fact that the pick-up head "T" described in this way is less bulky and lighter than the traditional ones. The inverted "U" shaped structure or frame 14 in which the plurality of unidirectional chains 5 are inserted has a much smaller than the forks used in the prior art pick-up systems.

A further advantage is the movement of the unidirectional chains 5 which, passing from a vertical position to a horizontal position sliding on a series of pinions 9, does not require movements towards and/or away of the support or frame 14 where they are inserted; this provides a system with a greater efficiency in terms of cycles per minute.

The invention claimed is:

1. A pick-up head for groups of tissue products, comprising:
a support connected or connectable to a robotic arm and comprising a first sliding guide extending between two opposite sides of said support;
a first pair of compacting means, opposite to each other and slidable towards and away from one another along said first sliding guide between an open configuration, wherein each compacting means is positioned at a respective end of said first sliding guide, and a compacting configuration wherein said compacting means are positioned along said first sliding guide in a mutually close position to encircle said group of tissue products;
wherein it further comprises:
a plurality of unidirectional chains, wherein the unidirectional chains are positioned outside each compacting means of said first pair, said unidirectional chains being slidable between a disengaging position, wherein said unidirectional chains are positioned vertically relative to said compacting means, and an engaging position wherein said unidirectional chains are at least partially positioned perpendicularly to said compacting means in such a way as to be positioned beneath the group of tissue products defining a cantilever support;
a plurality of guides associated with respective unidirectional chains of said plurality, each guide having a vertical stretch and a horizontal stretch designed to direct the sliding of said unidirectional chains in such a way that, in said engaging position, said chains protrude beyond an end edge of the horizontal stretch of said guide in such a way that said cantilever support is designed to support the bottom of said group of tissue products during a movement of said group of tissue products from one processing station to another when said first pair of compacting means is in the compacting configuration,
wherein the unidirectional chains have different lengths from each other, wherein at least a first group of unidirectional chains has a length less than at least a second group of unidirectional chains so as to define different extensions in said engaging position under said group of tissue products.

2. The pick-up head according to claim 1, wherein said unidirectional chains have a slight curvature designed to avoid a bending downwards of said unidirectional chains due to the weight of said group of tissue products when said plurality of unidirectional chains is in the engaging position.

3. The pick-up head according to claim 1, wherein each of said unidirectional chains, in said engaging position, extends up to or near to a mid-plane parallel to said two opposite sides of said support.

4. The pick-up head according to claim 1, wherein respective unidirectional chains opposite to said mid-plane, in said engaging position, have an extension such as to define a gap between the unidirectional chains of between 30 mm and 50 mm, preferably said gap being 30 mm.

5. The pick-up head according to claim 1, wherein said plurality of unidirectional chains is moved by at least one actuator.

6. The pick-up head according to claim 1, comprising a series of pinions comprising a number of pinions equal to the number of said unidirectional chains, each of said pinions being positioned close to said guides and designed to direct said unidirectional chains during the passage from the disengaging position to the engaging position and vice versa, each unidirectional chain being interposed between said respective guide and said respective pinion.

7. The pick-up head according to claim 6, wherein said vertical stretch and said horizontal stretch of said guide are joined by a curved stretch extending along at least one circular arc of a respective pinion.

8. The pick-up head according to claim 1, wherein said unidirectional chains, in a disengaging position, are positioned parallel to said first pair of compacting means and along a support in the shape of an upturned "U" outside each compacting means of the first pair.

9. The pick-up head according to claim 1, wherein said support also comprises a second sliding guide perpendicular to said first sliding guide and extending between further two opposite sides of said support, said pick-up head also comprising a second pair of compacting means positioned opposite each other and slidable along said second guide of said support, said second pair of compacting means being movable between an open configuration, wherein each compacting means is positioned at a respective end of said second guide, and a compacting configuration wherein said compacting means are positioned along said second guide to encircle said group of tissue products.

10. The pick-up head according to claim 9, wherein each compacting means of said second pair comprises at least two suction cups located at lower ends of the compacting means of said second pair configured so as to adhere to a cardboard flap to be positioned between one layer and the next of said group of tissue products.

11. The pick-up head according to claim 10, wherein said suction cups are configured to move between a raised position and a lowered position along said compacting means of said second pair.

12. The pick-up head according to claim 9, wherein said second pair of compacting means comprises sensors designed to detect a presence of a cardboard flap to be positioned between one layer and the next of said group of tissue products, preferably said sensors being configured for measuring a height of presence of the cardboard flap.

13. A pick-up station for a group of tissue products comprising:
 a pick-up head according to claim 1;
 a roller conveyor designed to move said group of tissue products advancing towards said pick-up head;
 a front stopping device movable between a lowered position, wherein the stopping device is positioned below said roller conveyor, and a raised position wherein said stopping device extends beyond a level on which the roller conveyor lies in such a way as to block the forward movement of said group of tissue products in a position below said pick-up head.

14. The pick-up station according to claim 13, wherein said roller conveyor has a U-shaped profile positioned beneath said level on which the roller conveyor lies and has a pitch equal to that of the plurality of unidirectional chains in such a way as to allow the sliding of said plurality of unidirectional chains in a space between one roller and the next when said plurality of unidirectional chains is in said engaging position.

* * * * *